United States Patent Office 3,367,832
Patented Feb. 6, 1968

3,367,832
TREATING PAIN WITH 2,2-DIPHENYL-4-(2-PIPERIDYL)-1,3-DIOXOLANE
Walter M. Anglin, Richland Township, Kalamazoo County, Mich., assignor to The Upjohn Company, Kalamazoo, Mich., a corporation of Delaware
No Drawing. Filed Apr. 1, 1964, Ser. No. 356,646
2 Claims. (Cl. 167—65)

This invention relates to analgesic compositions containing certain 1,3-dioxolanes and to a method for their use.

The compositions and method hereof embody the inclusion and use of (1) 2,2-diphenyl-4-(2-piperidyl)-1,3-dioxolanes of the formula

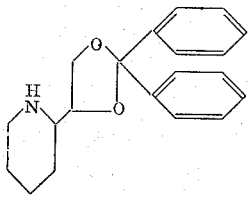

including α- and β-racemates and the four stereoisomers thereof, and (2) the physiologically acceptable acid addition salts of the foregoing, such as the hydrochloride, hydrobromide, salicylate, citrate, sulfate, acetate and the like.

Early animal studies with (+)2,2-diphenyl-4-(2-piperidyl)-1,3-dioxolane hydrochloride from the α-racemate, representative of the active ingredients hereof, showed not only an absence of analgesic activity but in fact a consistent tendency to sensitize the animals to pain in tests conducted by the standard hot place procedure of Eddy and Leimbach, J. Pharmacol. Exper. Therapeutics 107:385 (1953). In view of these observations it was totally unexpected that these compounds should, in carefully conducted clinical studies, demonstrate profound analgesic activity when administered to humans suffering from severe pain.

In general, administration to humans of from about 5 to about 300 mg. orally in single or divided doses produces the desired effects, from about 10 to about 30 mg. given three or four times daily being preferred for the amelioration of pain. However, exact dosages must be determined on an individual basis. In addition, these compounds are useful in injectable forms containing from about 3 to about 20 mg./ml., employing a depot vehicle for prolonged release or an aqueous vehicle.

The active ingredients of these compositions can be prepared representatively as follows:

PREPARATION 1

*2,2-diphenyl-4-(2-piperidyl)-1,3-dioxolane*

A mixture of 86 grams of 2-piperidyl-1,2-ethanediol hydrochloride, 103 grams of dimethoxydiphenylmethane and 20 ml. of isopropyl alcohol was heated in an oil bath at 130 degrees while stirring the reaction mixture. Dry hydrogen chloride was admitted below the surface of the liquid until the mixture was strongly acidic. Almost immediately a cake formed which was broken up. The heating was continued so as to give slow distillation of the solvent which was replenished as needed during a period of about 8 hours. All solvent was then removed at reduced pressure. The reaction product was extracted with ether and the residue was first crystallized from ethanol then recrystallized from methanol by diluting with 3 volumes of ether to give 54.5 g. of 2,2-diphenyl-4-(2-piperidyl)-1,3-dioxolane hydrochloride melting at 248–252°.

*Analysis.*—Calcd. for $C_{20}H_{23}NO_2 \cdot HCl$: C, 69.45; H, 6.99; N, 4.05. Found: C, 69.92; H, 6.92; N, 4.18.

The intermediate 2-piperidyl-1,2-ethanediol hydrochloride was prepared by hydrogenation of 116 g. of 2-pyridyl-1,2-ethanediol hydrochloride dissolved in 60 ml. of water using 2 g. of platinum oxide as catalyst. The theoretical amount of hydrogen was absorbed after a reaction period of 30 hours at 60 p.s.i. The catalyst was removed and the solution was evaporated to a heavy sirup at reduced pressure on the steam bath. A dilution of the sirup with an equal volume of isopropanol followed by re-evaporation to the sirupy residue was repeated three times, leaving a residue of 2-piperidyl-1,2-ethanediol hydrochloride.

PREPARATION 2

*2,2-diphenyl-4-(2-piperidyl)-1,3-dioxolane alpha-racemate*

Following the procedure of Preparation 1 to the point where the reaction product was washed with ethyl ether gave a mixture of the racemates of 2,2-diphenyl-4-(2-piperidyl)-1,3-dioxolane hydrochloride. When this mixture was extracted with 370 ml. of hot ethanol and filtered there was obtained a solution and a residue melting at about 300°. The solution was chilled to give a crystalline precipitate which was recrystallized from methanol until its composition appeared to be that of a pure racemate judged by melting point (256–260°) and by infrared absorption. The absorption spectrum of a crystalline sample in a potassium bromide pellet was distinguished by low absorption in two areas, 745 cm.$^{-1}$ and 1270–1310 cm.$^{-1}$. This pure material was designated alpha-racemate.

*Analysis.*—Calcd. for $C_{20}H_{23}NO_2 \cdot HCl$: C, 69.45; H, 6.99; N, 4.05. Found: C, 69.52; H, 7.17; N, 4.05.

PREPARATION 3

*2,2-diphenyl-4-(2-piperidyl)-1,3-dioxolane beta-racemate*

The ethanol insoluble material melting at 300 degrees described in Preparation 2 was recrystallized from methanol until its composition appeared to be that of a pure racemate as judged by melting point (301°) and by infrared absorption. The absorption spectrum of a crystalline sample in a potassium bromide pellet was distinguished by high absorption in two areas, 745 cm.$^{-1}$ and 1270–1310 cm.$^{-1}$ and by close conformity with the absorption spectrum of Preparation 2 throughout the remainder of the spectrum from 625 cm.$^{-1}$ to 4000 cm.$^{-1}$. This high melting material was designated beta-racemate.

*Analysis.*—Calcd. for $C_{20}H_{23}NO_2 \cdot HCl$: C, 69.45; H, 6.99; N, 4.05. Found: C, 69.15; H, 6.85; N, 3.85.

PREPARATION 4

*(+)2,2-diphenyl-4-(2-piperidyl)1,3-dioxolane hydrochloride from alpha-racemate*

A suspension of 24.45 g. (0.0707 mole) of 2,2-diphenyl - 4 - (2 - piperidyl) - 1,3 - dioxolane hydrochloride (Preparation 2) in 100 ml. (0.5 mole) of 20% aqueous sodium hydroxide was extracted with two 100-ml. portions and two 50-ml. portions of ether. The combined ethereal extracts were dried over anhydrous magnesium sulfate and concentrated to 21.5 g. of oily free base. This was dissolved in 80 ml. of methanol and treated with a solution of 5.83 g. (0.0389 mole) of L-(+)-tartaric acid in 80 ml. of methanol. After two and one-half hours at room temperature the crystalline product was filtered, washed and dried to a constant weight of 11.44 g. (84% of the theoretical yield). This was extracted from a Soxhlet thimble into 100 ml. of methanol to yield 10.80 g. (80% of the theoretical yield) of the L-(+)-tartrate salt of the dextrorotatory form of the racemic base (derived from Preparation 2), melting at 250–254° with decomposition.

*Analysis.*—Calcd. for $[C_{20}H_{23}NO_2]_2 \cdot C_4H_6O_6$: C, 68.73; H, 6.82; N, 3.64. Found: C, 68.81; H, 6.88; N, 3.67.

A suspension of 9.00 g. (0.0117 mole) of the above product in 40 ml. of 10% aqueous sodium hydroxide was extracted with three 50-ml. portions of ether. The combined ethereal extracts were dried over anhydrous magnesium sulfate and concentrated to 7.25 g. of oily free base. This was dissolved in 22.5 ml. of methanol and acidified to pH 1.5 with 6.7 ml. (0.023 mole) of 3.5 molar dry hydrogen chloride in anhydrous ether. Crystals began to form near the end of the acidification and precipitation was completed by the addition of 50 ml. of anhydrous ether. After standing at room temperature for two hours the product was filtered, washed and dried to constant weight of 7.00 g. (86% of the theoretical yield) of the dextrorotatory form of 2,2-diphenyl-4-(2-piperidyl)-1,3-dioxolane hydrochloride (alpha-racemate), melting at 248–254° with decomposition, $alpha_D^{20}$ +34° (2% in methanol).

*Analysis.*—Calcd. for $C_{20}H_{23}NO_2 \cdot HCl$: C, 69.45; H, 6.99; Cl, 10.25. Found: C, 69.92; H, 7.15; Cl, 10.15.

PREPARATION 5

*(−)2,2-diphenyl-4-(2-piperidyl)-1,3-dioxolane hydrochloride from alpha-racemate*

The mother liquor from the intermediate of Preparation 4 was evaporated to dryness, suspended in 25 ml. of 20% aqueous sodium hydroxide and extracted with two 50-ml. portions and one 100-ml. portion of ether. The combined ethereal extracts were dried over anhydrous magnesium sulfate and concentrated to 12.2 g. of oily free base. This was dissolved in 45 ml. of methanol and treated with a solution of 3.39 g. (0.0226 mole) of D(−)-tartaric acid in 45 ml. of methanol. After two and one-half hours at room temperature the crystalline product was filtered, washed and dried to a constant weight of 10.90 g. (80% of the theoretical yield). This was extracted from a Soxhlet thimble into 100 ml. of methanol to yield 10.09 g. (74% of the theoretical yield) of the D-(−)-tartrate salt of the levorotatory form of the racemic base (derived from Preparation 2), melting at 248–254° with decomposition.

*Analysis.*—Calcd. for $[C_{20}H_{23}NO_2]_2 \cdot C_4H_6O_8$: C, 68.73; H, 6.82; N, 3.64. Found: C, 69.09; H, 6.77; N, 3.69.

Using the procedure of Preparation 4, the above product was converted to the hydrochloride salt of the levorotatory base, 2,2-diphenyl-4-(2-piperidyl)-1,3-dioxolane, melting at 248–254° with decomposition, $alpha_D^{20}$ −34.5° (2% in methanol).

*Analysis.*—Calcd. for $C_{20}H_{23}NO_2 \cdot HCl$: C, 69.45; H, 6.99; Cl, 10.25. Found: C, 69.22; H, 6.71; Cl, 9.98.

The compositions of this invention comprise the indicated active ingredients dispersed in pharmaceutical carriers of conventional types for oral, parenteral, and topical administration. The method hereof embodies the administration of the said active ingredients for achieving analgesia, and in particular for ameliorating severe pain.

To obtain an advantageous combination of pharmacologic effects, compositions containing the primary active ingredient hereof in combination with pharmacologically significant amounts of complementing ingredients can be given. For example, an oral unit dosage form of an effective combination product comprises from about 5 to about 300 mg. of primary active ingredient with one or more of the following ingredients in approximately the indicated amounts: carisoprodol (200–350 mg.); reserpine (0.05–1 mg.); chlordiazepoxide (5–20 mg.); imipramine hydrochloride (25–200 mg.); phenobarbital or butabarbital (8–60 mg.) or amobarbital (16–120 mg.); chlorphenesin carbamate (200–400 mg.); phenothiazines such as chlorpromazine hydrochloride (10–50 mg.); meprobamate (100–400 mg.); dl-monobasic amphetamine phosphate (2–10 mg.); ectylurea (150–300 mg.); methscopolamine bromide (2.5–5 mg.); antiarthritic agents such as methylprednisolone (0.5–10 mg.), hydrocortisone (5–25 mg.), and prednisolone or prednisone (0.5–15 mg.); other analgetic agents such as aspirin (150–600 mg.), phenacetin (150–600 mg.), or N-acetyl-p-aminophenol (150–600 mg.); codeine (10–60 mg.); progestational agents such as medroxyprogesterone (2.5–10 mg.) or hydroxyprogesterone acetate (25–50 mg.); diuretics such as ethoxzolamide (50–150 mg.) or hydrochlorothiazide (50–100 mg.). Methods for preparing these combination products follow conventional procedures.

The following examples illustrate the best mode contemplated for carrying out the invention, but these examples are not to be construed as limiting the scope thereof.

EXAMPLE 1

*Tablets*

One thousand tablets for oral administration, each containing 10 mg. of (+)2,2-diphenyl-4-(2-piperidyl)-1,3-dioxolane hydrochloride from the α-racemate are prepared from the following types and amounts of ingredients:

| | Gm. |
|---|---|
| (+)2,2 - diphenyl - 4 - (2 - piperidyl) - 1,3 - dioxolane hydrochloride from α-racemate | 10 |
| Lactose | 175 |
| Starch | 10 |
| Magnesium stearate | 1.5 |

The ingredients are thoroughly mixed and slugged. The slugs are broken down by forcing through a screen and the resulting granules are then compressed into tablets each containing 10 mg. of (+)2,2-diphenyl-4-(2-piperidyl)-1,3-dioxolane hydrochloride from α-racemate.

The tablets are administered to adult humans at a dosage of 1 tablet 3–4 times daily for relief of pain.

EXAMPLE 2

*Injectable preparation*

A sterile oil preparation suitable for intramuscular injection, containing 20 mg. of (+)2,2-diphenyl-4-(2-piperidyl)-1,3-dioxolane from the α-racemate in each ml., is prepared as follows:

A mixture of 2 gm. aluminum monostearate and 98 ml. of peanut oil is slowly heated with stirring to a temperature of 100° C. The temperature is maintained at this level for one hour (when gelling is complete) and is then raised to 150° C. for one additional hour. The gel is then cooled and 2 gm. of sterile (+)2,2-diphenyl-4-(2-piperidyl)-1,3-dioxolane from the α-racemate is incorporated aseptically, with stirring, in 80 ml. of the gel. The total volume is made up to 100 ml. by addition of gel, with further stirring.

The composition so prepared is useful in the treatment of severe pain by intramuscular administration on a dosage of 1 ml. twice daily.

EXAMPLE 3

*Treatment*

In carefully controlled clinical studies compositions containing from 10 to 30 mg. of (+)2,2-diphenyl-4-(2-piperidyl)-1,3-dioxolane hydrochloride from α-racemate as the sole active ingredient were given three or four times daily to approximately two hundred patients experiencing severe pain of various origins. Striking relief was reported in a significant number of cases without evidence of addictive liability.

What is claimed is:

1. A method for relieving pain which comprises: administering orally to a subject experiencing pain an analgesic amount of a compound selected from the group consisting of 2,2-diphenyl-4-(2-piperidyl)-1,3-dioxolane and physiologically acceptable acid addition salts thereof.

2. A method for relieving pain which comprises: administering orally an effective amount of (+)2,2-diphenyl-4-(2-piperidyl)-1,3-dioxolane from the α-racemate to a subject experiencing pain.

References Cited

UNITED STATES PATENTS

| | | | |
|---|---|---|---|
| 2,606,909 | 8/1952 | Blicke | 260—338 |
| 3,262,938 | 7/1966 | Hardie | 260—294.7 |

ALBERT T. MEYERS, *Primary Examiner.*

JULIAN S. LEVITT, *Examiner.*

M. COHEN, S. FRIEDMAN, *Assistant Examiners.*